United States Patent [19]
Collier

[11] Patent Number: 5,690,495
[45] Date of Patent: Nov. 25, 1997

[54] INCENTIVE DEVICE FOR TOILET TRAINING CHILDREN

[76] Inventor: Tammy Mae Collier, 10280 Oak La., Grandbay, Ala. 36541

[21] Appl. No.: 746,171

[22] Filed: Nov. 7, 1996

[51] Int. Cl.⁶ .................................................. G09B 19/00
[52] U.S. Cl. .......................................... 434/258; 242/594.3
[58] Field of Search .......................... 434/258, 247; 242/594.3, 594, 594.5, 550; 4/300.1, 902

[56] References Cited

U.S. PATENT DOCUMENTS

| | | | |
|---|---|---|---|
| 3,750,971 | 8/1973 | Chevas | 242/594.5 |
| 4,162,490 | 7/1979 | Fu et al. | 4/902 X |
| 4,565,335 | 1/1986 | Rankin . | |
| 4,735,342 | 4/1988 | Goldstein | 242/594.3 X |
| 4,883,749 | 11/1989 | Roberts et al. | 434/247 |
| 5,499,008 | 3/1996 | Rosenkrantz et al. | 340/384.7 |
| 5,509,808 | 4/1996 | Bell | 434/247 |

*Primary Examiner*—Jeffrey A. Smith

[57] ABSTRACT

An incentive device for toilet training children including a housing having a lid hingedly secured to an open upper end thereof. A pair of horizontally disposed slots are formed through a front wall of the housing. Each of a pair of side walls has a rod extending inwardly from an inner surface thereof within the housing. A roll of toilet paper is rotatably disposed on a rod of one of the opposed side walls of the housing and extends outwardly through one of the horizontally disposed slots in the front wall of the housing. A roll of decorative stickers is rotatably disposed on the rod opposing the roll of toilet paper. The roll of decorative stickers extends outwardly of the hollow interior through one of the horizontally disposed slots in the front wall of the housing.

5 Claims, 3 Drawing Sheets

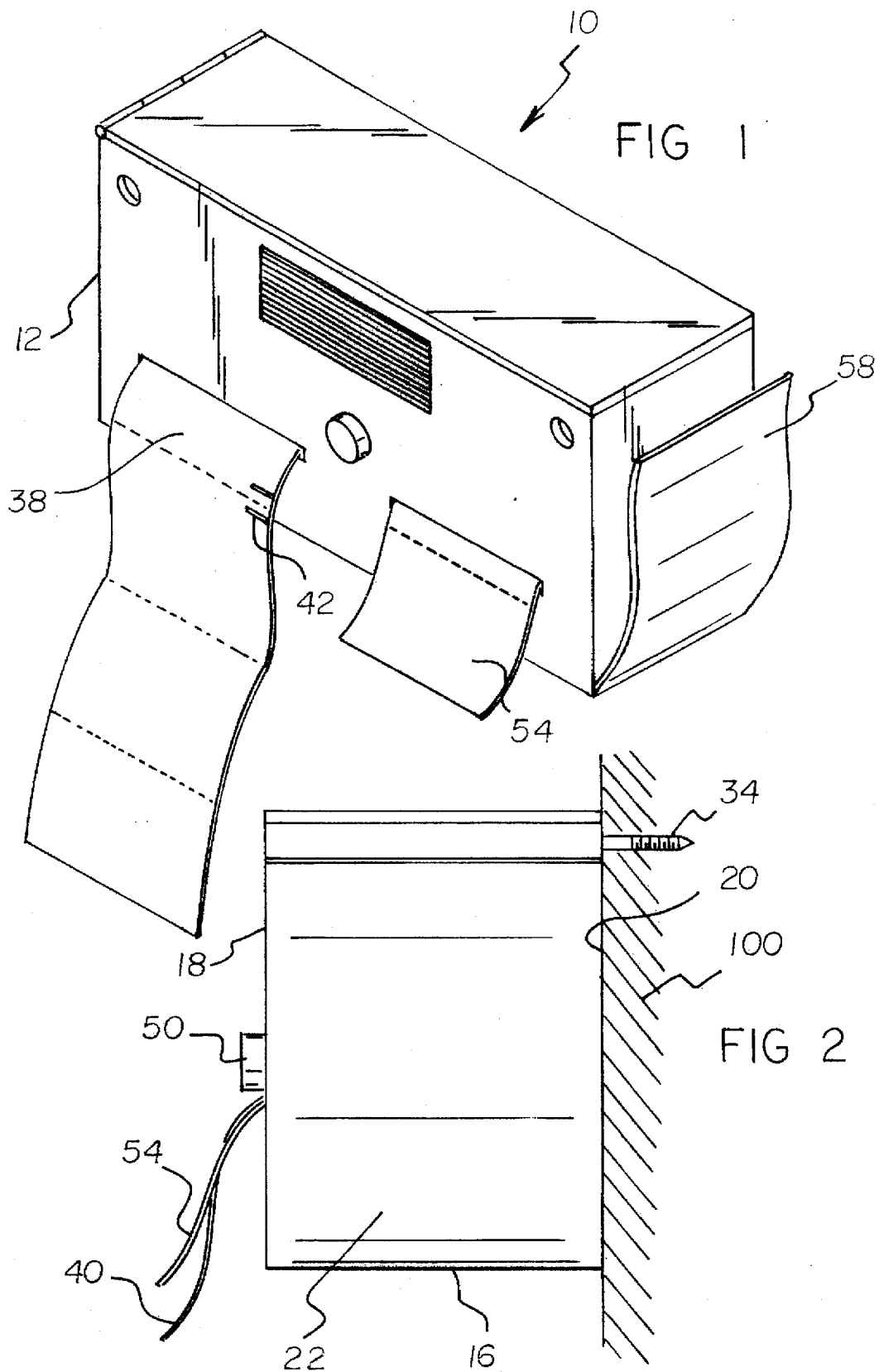

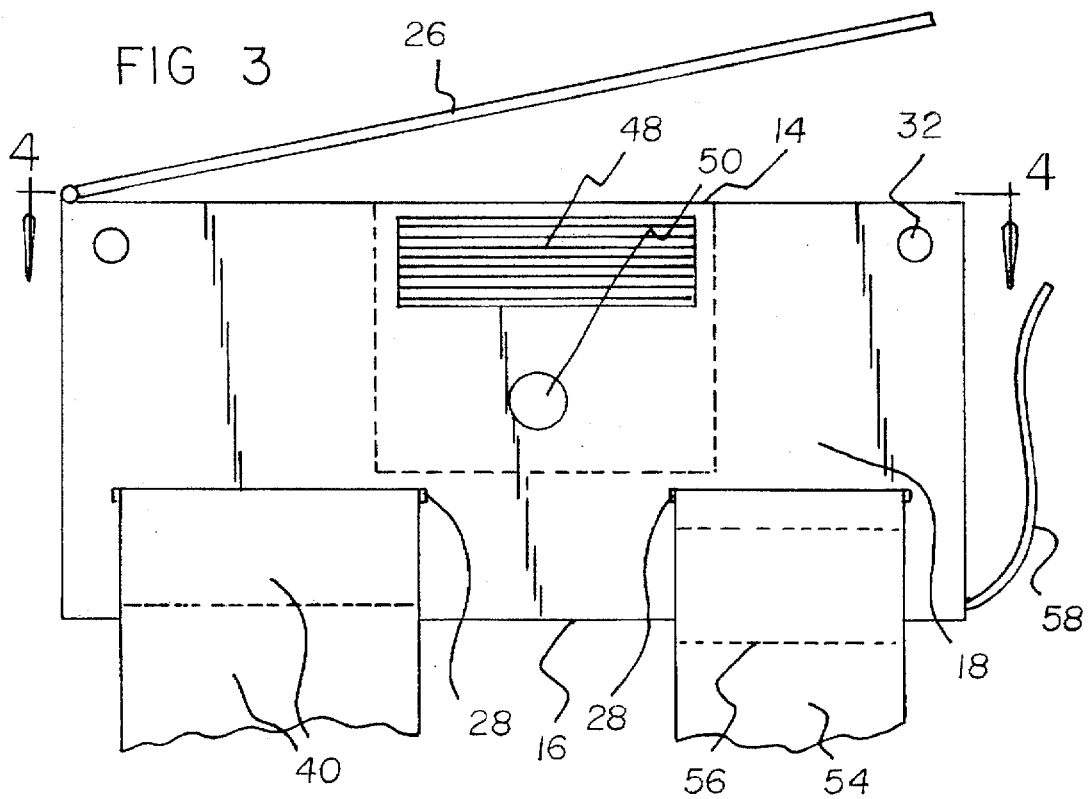
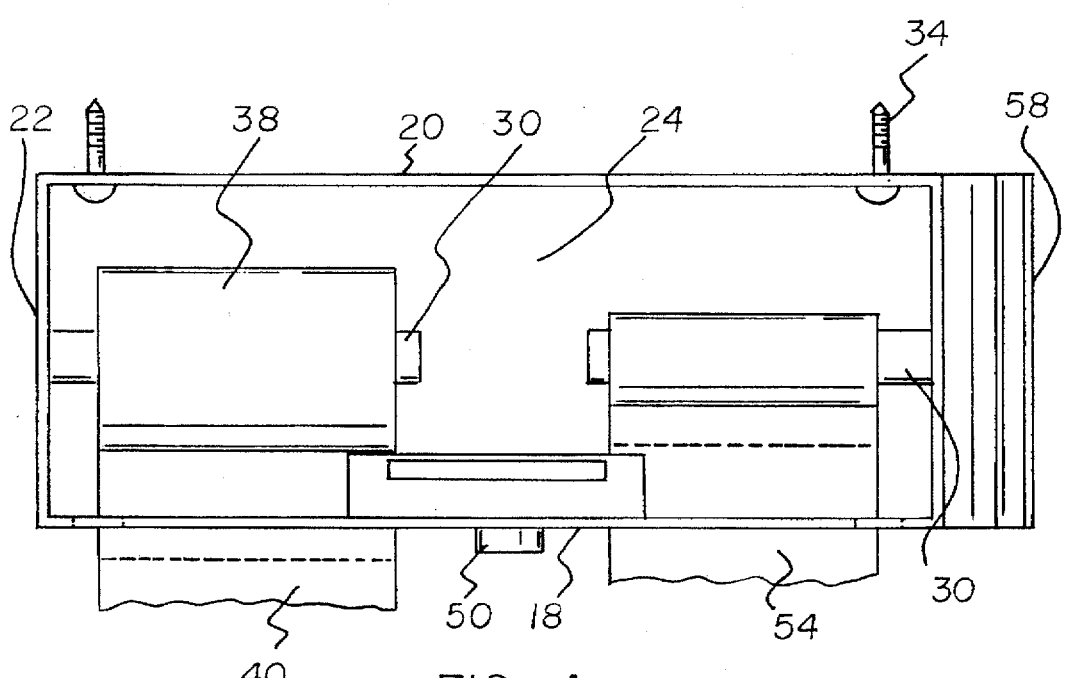

INCENTIVE DEVICE FOR TOILET TRAINING CHILDREN

BACKGROUND OF THE INVENTION

1. Field of the Invention

The present invention relates to an incentive device for toilet training children and more particularly pertains to training children to properly use a toilet and providing a reward for proper use of the toilet with an incentive device for toilet training children.

2. Description of the Prior Art

The use of toilet devices is known in the prior art. More specifically, toilet devices heretofore devised and utilized for the purpose of toilet training are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,773,863 to Douglas, III discloses an amusement device for a toilet bowl or urinal.

U.S. Pat. No. 4,883,749 to Roberts et al. discloses a children's toilet training device with differentiating means.

U.S. Pat. No. 5,008,964 to Dean et al. discloses a child's toilet.

U.S. Pat. No. 5,499,008 to Rosenkrantz et al. discloses an apparatus for providing artificial sounds in the vicinity of a toilet and method thereof.

While these devices fulfill their respective, particular objective and requirements, the aforementioned patents do not describe an incentive device for toilet training children for training children to properly use a toilet and providing a reward for proper use of the toilet.

In this respect, the incentive device for toilet training children according to the present invention substantially departs from the conventional concepts and designs of the prior art, and in doing so provides an apparatus primarily developed for the purpose of training children to properly use a toilet and providing a reward for proper use of the toilet.

Therefore, it can be appreciated that there exists a continuing need for new and improved incentive device for toilet training children which can be used for training children to properly use a toilet and providing a reward for proper use of the toilet. In this regard, the present invention substantially fulfills this need.

SUMMARY OF THE INVENTION

In the view of the foregoing disadvantages inherent in the known types of toilet devices now present in the prior art, the present invention provides an improved incentive device for toilet training children. As such, the general purpose of the present invention, which will be described subsequently in greater detail, is to provide a new and improved incentive device for toilet training children and method which has all the advantages of the prior art and none of the disadvantages.

To attain this, the present invention essentially comprises a housing having a generally rectangular configuration. The housing has an open top, a closed bottom, a front wall, a back wall, a pair of opposed side walls and a hollow interior. The open top has a lid hingedly secured thereto. The front wall has a pair of horizontally disposed slots therethrough. Each of the pair of side walls has a rod extending inwardly from an inner surface thereof within the hollow interior. A roll of toilet paper is rotatably disposed on a rod of one of the opposed side walls of the housing. The roll of toilet paper comprises a plurality of perforated sheets. The roll of toilet paper extends outwardly of the hollow interior through one of the horizontally disposed slots in the front wall of the housing. The plurality of perforated sheets are marked in twelve inch intervals by a colored mark. A cassette player is secured to an inner surface of the front wall of the housing within the hollow interior thereof. The cassette player has a speaker disposed within the front wall. The cassette player has a play button extending outwardly of the front wall of the housing. A roll of decorative stickers is rotatably disposed on the rod opposing the roll of toilet paper. The roll of decorative stickers has a perforated line disposed between each sticker. The roll of decorative stickers extends outwardly of the hollow interior through one of the horizontally disposed slots in the front wall of the housing. An inverted clip is secured to an outer surface of one of the pair of opposed side walls of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved incentive device for toilet training children which has all the advantages of the prior art toilet devices and none of the disadvantages.

It is another object of the present invention to provide a new and improved incentive device for toilet training children which may be easily and efficiently manufactured and marketed.

It is a further object of the present invention to provide a new and improved incentive device for toilet training children which is of durable and reliable construction.

An even further object of the present invention is to provide a new and improved incentive device for toilet training children which is susceptible of a low cost of manufacture with regard to both materials and labor, and which accordingly is then susceptible of low prices of sale to the consuming public, thereby making such an incentive device for toilet training children economically available to the buying public.

Even still another object of the present invention is to provide a new and improved incentive device for toilet training children for training children to properly use a toilet and providing a reward for proper use of the toilet.

Lastly, it is an object of the present invention to provide a new and improved incentive device for toilet training children including a housing having a lid hingedly secured to an open upper end thereof. A pair of horizontally disposed slots are formed through a front wall of the housing. Each of a pair of side walls has a rod extending inwardly from an inner surface thereof within the housing. A roll of toilet paper is rotatably disposed on a rod of one of the opposed side walls of the housing and extends outwardly through one of the horizontally disposed slots in the front wall of the housing. A roll of decorative stickers is rotatably disposed on the rod opposing the roll of toilet paper. The roll of decorative stickers extends outwardly of the hollow interior through one of the horizontally disposed slots in the front wall of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the incentive device for toilet training children constructed in accordance with the principles of the present invention.

FIG. 2 is a side elevation view of the device as secured to a wall.

FIG. 3 is a front elevation view of the present invention.

FIG. 4 is a cross-sectional view as taken along line 4—4 of FIG. 3.

The same reference numerals refer to the same parts through the various Figures.

DESCRIPTION OF THE PREFERRED EMBODIMENT

Figure 5:
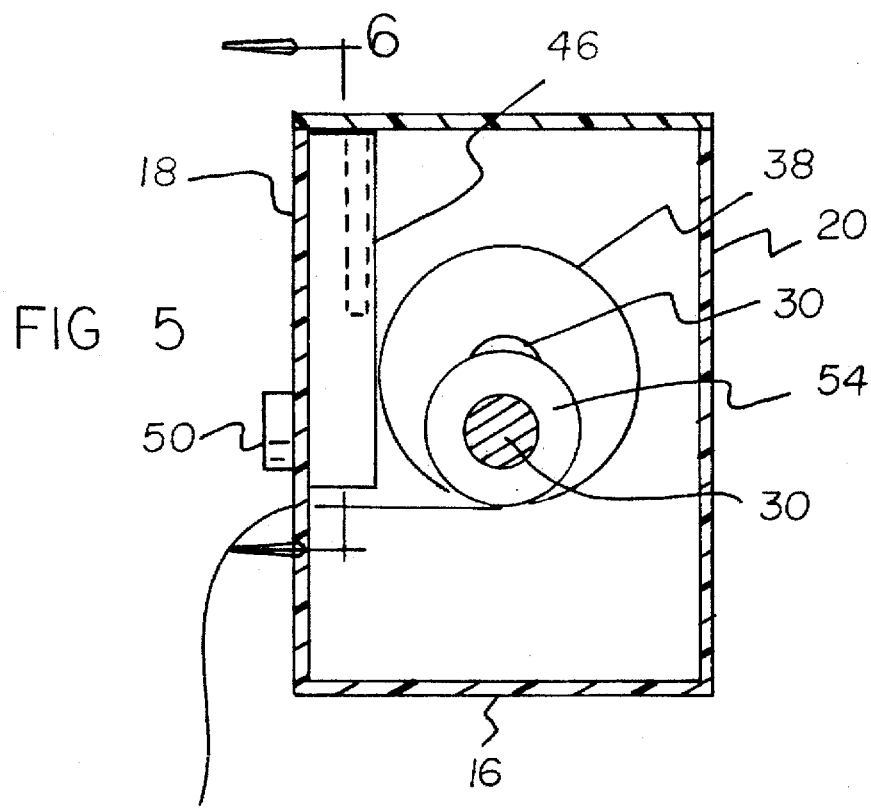
FIG. 5 is a cross-sectional side view of the present invention.
Figure 6:
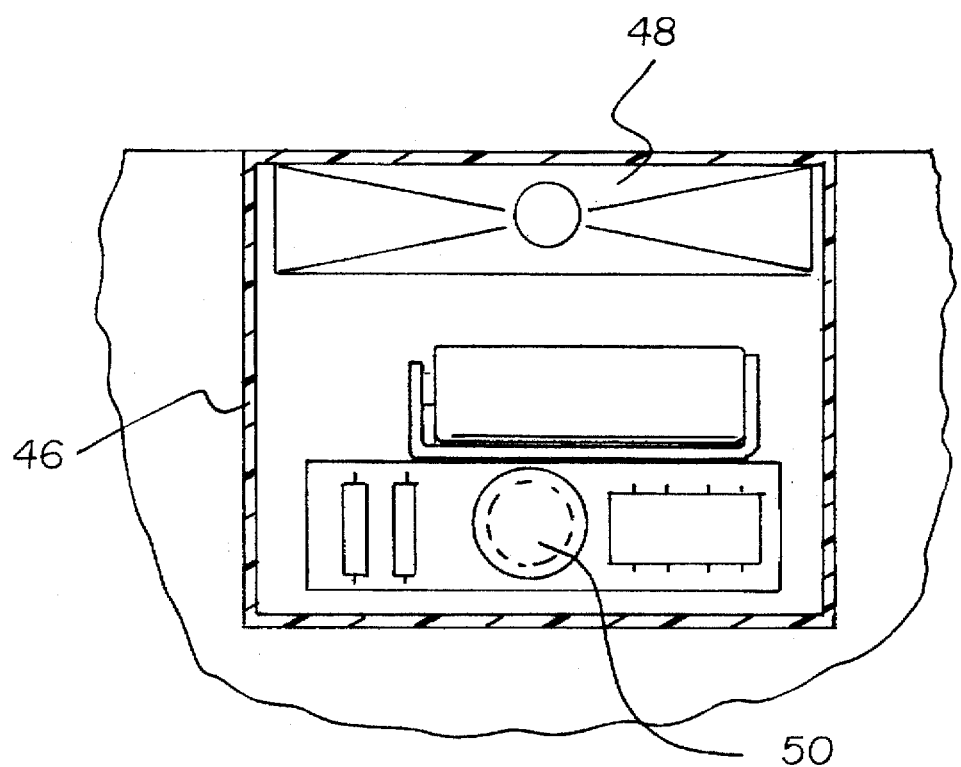
FIG. 6 is a cross-sectional view as taken along line 6—6 of FIG. 5.

With reference now to the drawings, and in particular, to FIGS. 1–6 thereof, the preferred embodiment of the new and improved incentive device for toilet training children embodying the principles and concepts of the present invention and generally designated by the reference number 10 will be described.

Specifically, it will be noted in the various Figures that the device relates to a incentive device for toilet training children for training children to properly use a toilet and providing a reward for proper use of the toilet. In its broadest context, the device consists of a housing, a roll of toilet paper, a cassette player, a roll of decorative stickers and an inverted clip. Such components are individually configured and correlated with respect to each other so as to attain the desired objective.

The device 10 includes a housing 12 having a generally rectangular configuration. The housing 12 has an open top 14, a closed bottom 16, a front wall 18, a back wall 20, a pair of opposed side walls 22 and a hollow interior 24. The open top 14 has a lid 26 hingedly secured thereto. The front wall 18 has a pair of horizontally disposed slots 28 therethrough. Each of the pair of side walls 22 has a rod 30 extending inwardly from an inner surface thereof within the hollow interior 24. The housing 12 also includes a pair of apertures 32 extending through the front wall 18 and the back wall 20. A pair of mounting screws 34 extend through the pair of apertures 32 to secure the housing to a wall 100 or other recipient surface adjacent to a toilet. The housing 12 should be secured within reach of a small child positioned on the toilet.

A roll of toilet paper 38 is rotatably disposed on a rod 30 of one of the opposed side walls 22 of the housing 12. The roll of toilet paper 38 comprises a plurality of perforated sheets 40. The roll of toilet paper 38 extends outwardly of the hollow interior 24 through one of the horizontally disposed slots 28 in the front wall 18 of the housing 12. The plurality of perforated sheets 40 are marked in twelve inch intervals by a colored mark 42. Note FIG. 1. The child is taught to tear off the sheets 40 in twelve inch intervals so as not to use and/or waste excess toilet paper 38.

A cassette player 46 is secured to an inner surface of the front wall 18 of the housing 12 within the hollow interior 24 thereof. The cassette player 46 has a speaker 48 disposed within the front wall 18. The cassette player 46 has a play button 50 extending outwardly of the front wall 18 of the housing 12. The cassette player 46 plays prerecorded messages of praise. Once the child properly uses the toilet, he/she presses the play button to hear the congratulatory message on the tape loaded in the cassette player 46.

A roll of decorative stickers 54 is rotatably disposed on the rod 30 opposing the roll of toilet paper 38. The roll of decorative stickers 54 has a perforated line 56 disposed between each sticker. The roll of decorative stickers 54 extends outwardly of the hollow interior 24 through one of the horizontally disposed slots 28 in the front wall 18 of the housing 12. After the child hears the congratulatory message from the cassette player 46, he/she is then permitted to remove a sticker.

An inverted clip 58 is secured to an outer surface of one of the pair of opposed side walls 22 of the housing 12. The inverted clip 58 serves as a holder for children's magazines and books.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An incentive device for toilet training children for training children to properly use a toilet and providing a reward for proper use of the toilet comprising, in combination:
   a housing having a generally rectangular configuration, the housing having an open top, a closed bottom, a front wall, a back wall, a pair of opposed side walls and a hollow interior, the open top having a lid hingedly secured thereto, the front wall having a pair of horizontally disposed slots therethrough, each of the pair of side walls having a rod extending inwardly from an inner surface thereof within the hollow interior;
   a roll of toilet paper rotatably disposed on a rod of one of the opposed side walls of the housing, the roll of toilet paper comprising a plurality of perforated sheets, the roll of toilet paper extends outwardly of the hollow interior through one of the horizontally disposed slots in the front wall of the housing, the plurality of perforated sheets being marked in twelve inch intervals by a colored mark;
   a cassette player secured to an inner surface of the front wall of the housing within the hollow interior thereof, the cassette player having a speaker disposed within the front wall, the cassette player having a play button extending outwardly of the front wall of the housing;
   a roll of decorative stickers rotatably disposed on the rod opposing the roll of toilet paper, the roll of decorative stickers having a perforated line disposed between each sticker, the roll of decorative stickers extends outwardly of the hollow interior through one of the horizontally disposed slots in the front wall of the housing; and
   an inverted clip secured to an outer surface of one of the pair of opposed side walls of the housing.

2. An incentive device for toilet training children comprising:
   a housing having a lid hingedly secured to an open upper end thereof, a pair of horizontally disposed slots through a front wall of the housing, each of a pair of side walls having a rod extending inwardly from an inner surface thereof within the housing;
   a roll of toilet paper rotatably disposed on a rod of one of the opposed side walls of the housing and extending outwardly through one of the horizontally disposed slots in the front wall of the housing; and
   a roll of decorative stickers rotatably disposed on the rod opposing the roll of toilet paper, the roll of decorative stickers extends outwardly through one of the horizontally disposed slots in the front wall of the housing.

3. The incentive device as set forth in claim 2 wherein the roll of toilet paper comprising a plurality of perforated sheets, the plurality of perforated sheets being marked in twelve inch intervals by a colored mark.

4. The incentive device as set forth in claim 3 and further including a cassette player secured to an inner surface of the front wall of the housing, the cassette player having a speaker disposed within the front wall, the cassette player having a play button extending outwardly of the front wall of the housing.

5. The incentive device as set forth in claim 4 and further including an inverted clip secured to an outer surface of one of the pair of opposed side walls of the housing.

* * * * *